United States Patent
Nachenberg

(10) Patent No.: US 7,478,431 B1
(45) Date of Patent: Jan. 13, 2009

(54) HEURISTIC DETECTION OF COMPUTER VIRUSES

(75) Inventor: Carey Nachenberg, Northridge, CA (US)

(73) Assignee: Symantec Corporation, Cupertino, CA (US)

( * ) Notice: Subject to any disclaimer, the term of this patent is extended or adjusted under 35 U.S.C. 154(b) by 1167 days.

(21) Appl. No.: 10/211,827

(22) Filed: Aug. 2, 2002

(51) Int. Cl.
G06F 21/00 (2006.01)

(52) U.S. Cl. .......................... 726/24; 726/22; 713/175; 713/176; 713/188

(58) Field of Classification Search ................. 713/188, 713/175, 176; 726/24, 22
See application file for complete search history.

(56) References Cited

U.S. PATENT DOCUMENTS

| | | | |
|---|---|---|---|
| 5,440,723 A | 8/1995 | Arnold et al. | |
| 5,452,442 A * | 9/1995 | Kephart | 714/38 |
| 5,473,769 A | 12/1995 | Cozza | |
| 5,572,590 A | 11/1996 | Chess | |
| 5,696,822 A | 12/1997 | Nachenberg | |
| 5,715,174 A | 2/1998 | Cotichini et al. | |
| 5,715,464 A | 2/1998 | Crump et al. | |
| 5,758,359 A | 5/1998 | Saxon | |
| 5,812,763 A * | 9/1998 | Teng | 726/25 |
| 5,889,943 A | 3/1999 | Ji et al. | |
| 5,951,698 A | 9/1999 | Chen et al. | |
| 5,956,481 A | 9/1999 | Walsh et al. | |
| 5,960,170 A | 9/1999 | Chen et al. | |
| 5,978,917 A | 11/1999 | Chi | |
| 5,987,610 A | 11/1999 | Franczek et al. | |
| 5,999,723 A * | 12/1999 | Nachenberg | 703/22 |
| 6,003,042 A * | 12/1999 | Melahn | 707/203 |
| 6,021,510 A * | 2/2000 | Nachenberg | 714/38 |

(Continued)

FOREIGN PATENT DOCUMENTS

EP      1 280 039 A      1/2003

(Continued)

OTHER PUBLICATIONS

"Technical Briefs Information on Computer Viruses"; San Diego State University; Apr. 4, 1997; pp. 1-4; "http://web.archive.org/web/20010219013700/http://www-rohan.sdsu.edu/viruses.html".*

(Continued)

Primary Examiner—Carl Colin
(74) Attorney, Agent, or Firm—Fenwick & West LLP

(57) ABSTRACT

Computer-implemented methods, apparati, and computer-readable media for detecting the presence of viral infections in target files (10) located within a computer. The invention has broad applicability to a number of different platforms, including Windows. A preferred method for performing the invention comprises the steps of: scanning a target file (10) with an antivirus scanner, said scanning step including computing (44) a target section (19) corresponding to an invariant section of said target file (10); declaring the target file (10) to be a tracked file (10) when the target section (19) matches an invariant section in a database generated (41) from uninfected versions of the target files (10); for each tracked file (10), identifying (47) a variant section that is likely to be varied by a viral infection; comparing (48) the variant section in the tracked file (10) with the same variant section in the uninfected version of the tracked file (10) in said database; and declaring (80) a suspicion that a virus is present in the tracked file (10) when the two variant sections do not match.

29 Claims, 6 Drawing Sheets

U.S. PATENT DOCUMENTS

| | | | |
|---|---|---|---|
| 6,044,381 A * | 3/2000 | Boothby et al. | 707/201 |
| 6,052,709 A | 4/2000 | Paul et al. | |
| 6,070,244 A | 5/2000 | Orchier et al. | |
| 6,072,830 A | 6/2000 | Proctor et al. | |
| 6,088,803 A | 7/2000 | Tso et al. | |
| 6,094,731 A | 7/2000 | Waldin et al. | |
| 6,104,872 A | 8/2000 | Kubota et al. | |
| 6,108,799 A | 8/2000 | Boulay et al. | |
| 6,167,434 A | 12/2000 | Pang | |
| 6,192,379 B1 | 2/2001 | Bekenn | |
| 6,199,181 B1 | 3/2001 | Rechef et al. | |
| 6,275,938 B1 | 8/2001 | Bond et al. | |
| 6,338,057 B1 * | 1/2002 | Weeks | 707/3 |
| 6,338,141 B1 | 1/2002 | Wells | |
| 6,357,008 B1 | 3/2002 | Nachenberg | |
| 6,370,648 B1 | 4/2002 | Diep | |
| 6,493,007 B1 | 12/2002 | Pang | |
| 6,535,891 B1 | 3/2003 | Fisher et al. | |
| 6,552,814 B2 | 4/2003 | Okimoto et al. | |
| 6,611,925 B1 | 8/2003 | Spear | |
| 6,618,735 B1 * | 9/2003 | Krishnaswami et al. | 707/203 |
| 6,622,150 B1 | 9/2003 | Kouznetsov et al. | |
| 6,636,872 B1 * | 10/2003 | Heath et al. | 707/201 |
| 6,678,734 B1 | 1/2004 | Haatainen et al. | |
| 6,697,950 B1 | 2/2004 | Ko | |
| 6,711,583 B2 * | 3/2004 | Chess et al. | 707/104.1 |
| 6,721,721 B1 | 4/2004 | Bates et al. | |
| 6,748,534 B1 * | 6/2004 | Gryaznov et al. | 713/188 |
| 6,763,462 B1 | 7/2004 | Marsh | |
| 6,763,466 B1 * | 7/2004 | Glover | 726/24 |
| 6,792,543 B2 * | 9/2004 | Pak et al. | 726/24 |
| 6,813,712 B1 * | 11/2004 | Luke | 726/24 |
| 6,851,057 B1 * | 2/2005 | Nachenberg | 726/24 |
| 6,883,168 B1 * | 4/2005 | James et al. | 717/178 |
| 6,910,134 B1 | 6/2005 | Maher et al. | |
| 6,922,781 B1 * | 7/2005 | Shuster | 713/188 |
| 6,928,555 B1 * | 8/2005 | Drew | 726/24 |
| 6,963,978 B1 * | 11/2005 | Muttik et al. | 713/188 |
| 6,981,279 B1 * | 12/2005 | Arnold et al. | 726/22 |
| 7,055,175 B1 * | 5/2006 | Le Pennec et al. | 726/24 |
| 7,093,135 B1 * | 8/2006 | Radatti et al. | 713/188 |
| 7,216,366 B1 * | 5/2007 | Raz et al. | 726/24 |
| 2002/0004908 A1 | 1/2002 | Galea | |
| 2002/0035696 A1 | 3/2002 | Thacker | |
| 2002/0046275 A1 | 4/2002 | Crosbie et al. | |
| 2002/0083175 A1 | 6/2002 | Afek et al. | |
| 2002/0091940 A1 | 7/2002 | Wellborn et al. | |
| 2002/0157008 A1 | 10/2002 | Radatti | |
| 2002/0162015 A1 * | 10/2002 | Tang | 713/200 |
| 2002/0178374 A1 * | 11/2002 | Swimmer et al. | 713/200 |
| 2003/0023865 A1 * | 1/2003 | Cowie et al. | 713/200 |
| 2003/0046558 A1 * | 3/2003 | Teblyashkin et al. | 713/188 |
| 2003/0051026 A1 | 3/2003 | Carter et al. | |
| 2003/0065926 A1 | 4/2003 | Schultz et al. | |
| 2003/0115485 A1 | 6/2003 | Milliken | |
| 2003/0120951 A1 | 6/2003 | Gartside et al. | |
| 2003/0126449 A1 * | 7/2003 | Kelly et al. | 713/187 |
| 2003/0140049 A1 | 7/2003 | Radatti | |
| 2003/0191966 A1 | 10/2003 | Gleichauf | |
| 2003/0212902 A1 | 11/2003 | van der Made | |
| 2003/0236995 A1 | 12/2003 | Fretwell, Jr. | |
| 2004/0015712 A1 * | 1/2004 | Szor | 713/200 |
| 2004/0015726 A1 | 1/2004 | Szor | |
| 2004/0030913 A1 | 2/2004 | Liang et al. | |
| 2004/0158730 A1 * | 8/2004 | Sarkar | 713/200 |
| 2004/0162808 A1 | 8/2004 | Margolus et al. | |
| 2004/0181687 A1 | 9/2004 | Nachenberg et al. | |
| 2005/0021740 A1 | 1/2005 | Bar et al. | |
| 2005/0044406 A1 | 2/2005 | Stute | |
| 2005/0132205 A1 * | 6/2005 | Palliyil et al. | 713/188 |
| 2005/0177736 A1 * | 8/2005 | de los Santos et al. | 713/188 |
| 2005/0204150 A1 * | 9/2005 | Peikari | 713/188 |
| 2006/0064755 A1 | 3/2006 | Azadet et al. | |

FOREIGN PATENT DOCUMENTS

| | | |
|---|---|---|
| GB | 2 364 142 A | 1/2002 |
| WO | WO 97/39399 A | 10/1997 |
| WO | WO 01/91403 A | 11/2001 |
| WO | WO 02/05072 A | 1/2002 |

OTHER PUBLICATIONS

"System File Protection and Windows Me", [online], last updated Dec. 4, 2001, [retrieved on Apr. 9, 2002]. Retrieved from the Internet: <URL: http://www.Microsoft.com/hwdev/archive/sfp/WinME_sfpP.asp.

"Description of the Windows 2000 Windows File Protection Feature (Q222193)", [online], first published May 26, 1999, last modified Jan. 12, 2002, [retrieved on Apr. 9, 2002]. Retrieved from the Internet: <URL: http://support.microsoft.com/default.aspx?scid=kb;EN-US;q222193.

"Software: Windows ME; Windows ME and System File Protection", [online], last updated Mar. 11, 2002, [retrieved on Apr. 9, 2002]. Retrieved from the Internet: <URL: http://www.wackyb.co.nz/mesfp.html.

Parkhouse, Jayne, "Pelican SafeTNet 2.0" [online], Jun. 2000, SC Magazine Product Review, [retrieved on Dec. 1, 2003]. Retrieved from the Internet: <URL: http://www.scmagazine.com/scmagazine/standalone/pelican/sc_pelican.html.

Szor, P. and Ferrie, P., "Hunting for Metamorphic", Virus Bulletin Conference, Sep. 2001, Virus Bulletin Ltd., The Pentagon, Abingdon, Oxfordshire, England, pp. 123-144.

"News Release—Symantec Delivers Cutting-Edge Anti-Virus Technology with Striker32", Oct. 1, 1999, 2 pages, [online]. Retrieved on Nov. 11, 2003. Retrieved from the Internet:<URL:http://www.symantec.com/press/1999/n991001.html>. Author unknown.

Szor, P. and Ferrie, P., Attacks on Win32, Virus Bulletin Conference, Sep. 1998, Virus Bulletin Ltd., The Pentagon, Abingdon, Oxfordshire, England, pp. 57-84.

Szor, P. and Ferrie, P., "Attacks in Win32 Part II", Virus Bulletin Conference, Sep. 2000, Virus Bulletin Ltd., The Pentagon, Abingdon, Oxfordshire, England, pp. 47-68.

Delio, M., "Virus Throttle a Hopeful Defense", Wired News, Dec. 9, 2002, retrieved from Internet Http://www.wired.com/news/print/0,1294,56753,00.html Jan. 7, 2003.

"System File Protection and Windows ME", [online], last updated Dec. 4, 2001, [retrieved on Apr. 9, 2002] Retrieved from the Internet: <URL: http://www.Microsoft.com/hwdev/archive/sfp/winME_sfpP.asp>.

Toth, et al "Connection-history based anomaly detection" Proceedings of the 2002 IEEE Workshop on Information Assurance and Security. West Point, NY, Jun. 17-19, 2002. pp. 30-35.

Kephart, Jeffrey et al., "An Immune System For Cyberspace" IBM Thomas J. Watson Research Center, IEEE 1997, pp. 879-884.

Symantec Corporation, "Norton AntiVirus Corporate Edition", 1999, Version 1, pp. 15,22.

Bakos et al., "Early Detection of Internet Work Activity by Metering ICMP Destination Unreachable Activity.", Proc. Of SPIE Conference on Sensors, and Command, Control, Communications and Intelligence, Orlando, Apr. 2002.

* cited by examiner

HEURISTIC DETECTION OF COMPUTER VIRUSES

TECHNICAL FIELD

This invention pertains to the field of detecting malicious viruses in computer files.

BACKGROUND ART

Computer viruses have been detected using a technique known as integrity checking. In integrity checking, the antivirus scanner computes hashes for all executable files on a computer, and stores the hashes in a database. Should any of those files change, their hash will change too, and the integrity checker alerts the user. Such an integrity checking scheme can detect a very high number of new viruses. Unfortunately, the integrity checker is extremely susceptible to false positives. For example, if the user legitimately modifies an executable file to a new version, or if the file has been infected with a virus and then repaired, the integrity checking software may very well declare the presence of a virus even though no virus is actually present. The present invention is able to avoid these types of false positives.

A second problem with integrity checking is that the database of integrity (hash) data must be built ab initio on the user's computer. If the computer is already infected when the integrity checker is first used, the integrity data will contain hashes of infected files. This is a false negative problem, since the integrity checker is unable to detect this type of existing infection on the computer. It can detect only new infections introduced after the initial integrity database has been built. In one embodiment of the present invention, a database, e.g., a typical antivirus definition file, is pre-populated with version and hash information and then shipped to the user. Consequently, existing infections as well as future infections on the user's computer can be detected. This is another benefit of the present invention over the integrity checking method.

Microsoft Corporation has introduced a feature on newer versions of its Windows operating systems called System File Protection (SFP). SFP is used to prevent the user, when installing a new program, from overriding protected system files with updated copies that will cause stability problems on the computer. SFP is described in "System File Protection and Windows Me", "http://www.microsoft.com/hwdev/archive/sfp/WinME_sfpP.asp", last updated Dec. 4, 2001, downloaded from the Internet Apr. 9, 2002; "Description of the Windows 2000 Windows File Protection Feature (Q222193)", "http://support.microsoft.com/default.aspx?scid=kb;EN-US;q222193", first published May 26, 1999, last modified Jan. 12, 2002, downloaded from the Internet Apr. 9, 2002; and "Software: Windows ME; Windows ME and System File Protection", "http://www.wacky-b.co.nz/mesfp.html", last updated Mar. 11, 2002, downloaded from the Internet Apr. 9, 2002.

SFP checks the new file's version number to ensure that it is not older than the previous version of the file that is to be overwritten. If the version number of the new file is newer or the same vintage as the version number of the original file, the original file is replaced. This is done to ensure that a lot of old DLLs (Dynamic Link Libraries) are not clogging up the computer. SFP also checks for inadvertent system file deletions, and replaces any protected system files that have been improperly deleted. Finally, SFP checks the file's version number and a full hash of the file to determine that the file has not been corrupted. If the version is recognized but the file's contents have changed in any way, the entire file is replaced from a backup copy. The user is not alerted.

SFP differs from the present invention in that:

1) The stated intent of SFP is to address the problem of files that have been corrupted, not files that have been infected by viruses;

2) SFP generates a full file hash that is variant with respect to repair (that is, tracked files that have been corrupted and then repaired may still cause the system to trigger and identify the file as corrupted, even if the file was properly repaired), while the present invention uses a minimal code hash that is invariant to repair;

3) SFP uses just the version information to track files, while the present invention uses other infection-invariant components of the file, such as hashes of the data segment; and 4) SFP works on an individual user's computer, whereas the present invention can be used on any computer, such as an e-mail gateway, a file server, a desktop computer, or a back end infrastructure computer (a computer at the headquarters facility of an antivirus software company where suspicious viruses are tested).

DISCLOSURE OF INVENTION

Computer-implemented methods, apparati, and computer-readable media for detecting the presence of viral infections in target files (10) located within a computer. A preferred method for performing the invention comprises the steps of: scanning a target file (10) with an antivirus scanner, said scanning step including computing (44) a target section (19) corresponding to an invariant section of said target file (19); declaring the target file (10) to be a tracked file (10) when the target section (19) matches an invariant section in a database generated (41) from uninfected versions of the target file (10); for each tracked file (10), identifying (47) a variant section that is likely to be varied by a viral infection; comparing (48) the variant section in the tracked file (10) with the same variant section in the uninfected version of the tracked file (10) in said database; and declaring (80) a suspicion that a virus is present in the tracked file (10) when the two variant sections do not match.

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

As used throughout this patent application, "malicious code" means any computer program, module, or piece of code that enters a computer system without an authorized user's knowledge and/or without an authorized user's consent. The term "malicious code" includes viruses, Trojan horses, and worms. The malicious code may or may not have the ability to replicate itself.

This invention has particular applicability to countering the effects of viral code, i.e., parasitic malicious code that attacks an executable (code) section of a file. Viral code usually doesn't have a data section of its own. The present invention also counters Trojanizations, i.e., malicious modifications of executable code with the intent of changing the purpose of the code for malicious reasons. As used throughout this patent application including claims, "virus" includes "viral code" and "Trojanizations" as defined above.

Figure 1:
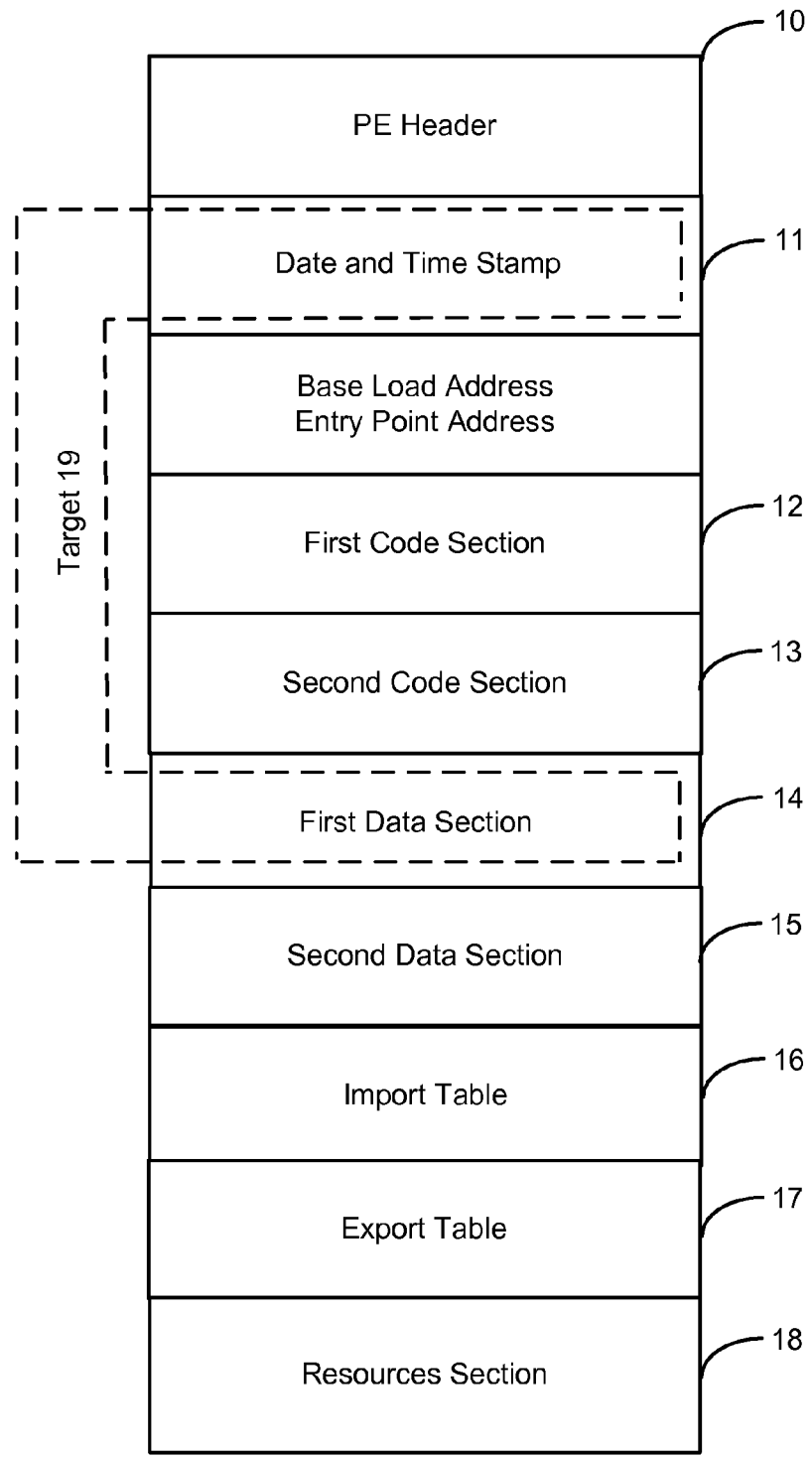
FIG. 1 is an illustration of a PE (Portable Executable) file format 10 for which the present invention has applicability.

FIG. 1 illustrates a file (module) 10 which the virus may infect. For purposes of illustration, file 10 is shown as being in the PE (Portable Executable) format, a standard format for files used in the Win32 API (Application Programming Interface). Win32 is used in 32 bit operating systems manufactured by Microsoft Corporation.

PE file 10 often includes a PE header 11, one or more code sections 12, 13, one or more data sections 14, 15, an import table 16, an export table 17, and a resources section 18 (a fix-up section used by the loader). PE header 11 may include a date and time stamp, a base load address where file 10 is inserted in the computer memory, and an entry point address, i.e., an offset from the beginning of file 10 where file 10 begins executing.

Figure 2:
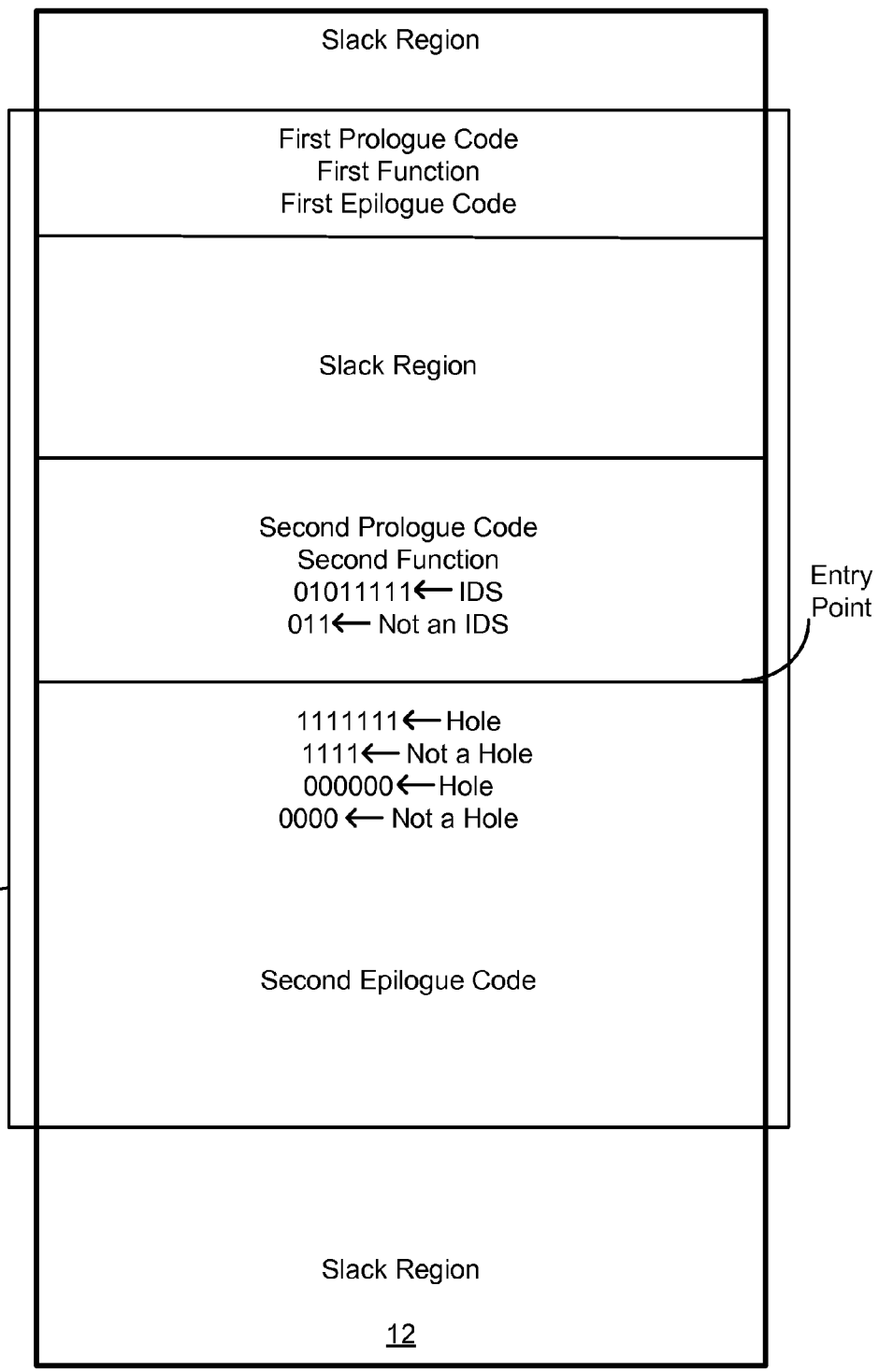
FIG. 2 is an illustration of a code section 12 within PE file 10.

FIG. 2 illustrates details of first code section 12 of FIG. 1. At the beginning and end of section 12 are slack regions. A slack region takes up space but doesn't do anything purposeful. The critical program code, consisting of two functions each with prologue code and epilogue code, is situated between these two slack regions. Prologue code is a sequence of instructions that precedes each function or procedure within code section 12; prologue code instructions perform logistical setup before a function or procedure gains control and executes. These instructions can be used to locate the start of a machine language function or procedure within the code section 12. Each function or procedure ends with an epilogue code section; the epilogue code is a sequence of instructions that clean up after the execution of a function or procedure. The epilogue code can be used to identify the end of valid functions. Each pair of functions (preceded by prologue code and succeeded by epilogue code) may be broken up by another slack region, as illustrated.

The critical program code is the region or set of regions where the executable instructions reside, after eliminating the slack regions. This region or these regions may be identified, in one embodiment, by searching for prologue and epilogue code sequences. The entry point is an address within the critical program code where the executable instructions begin when a program is launched.

Figure 3:
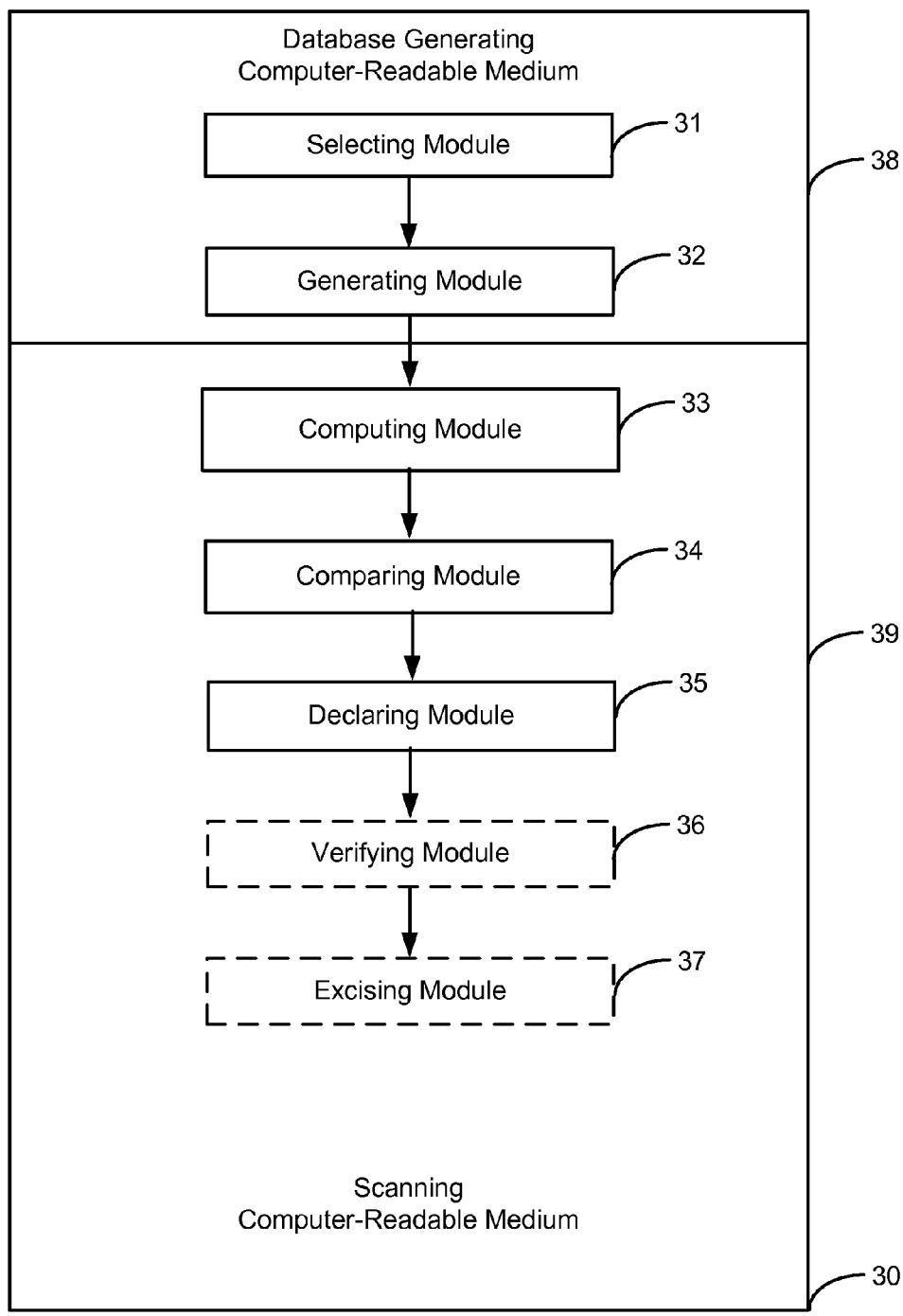
FIG. 3 is a block diagram illustrating software, firmware, and/or hardware modules 31-37 used in a preferred embodiment of the present invention.
Figure 4:
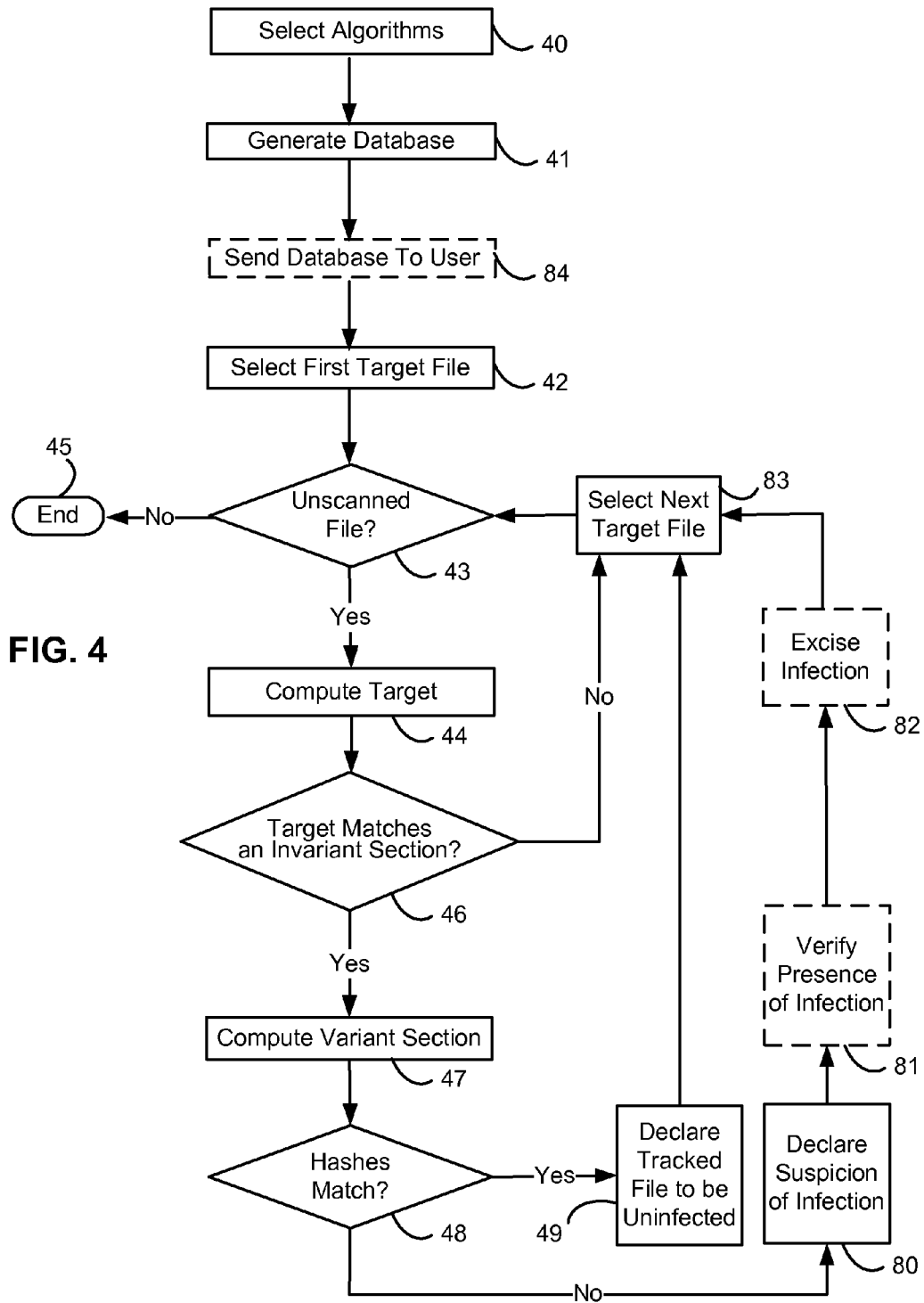
FIG. 4 is a flow diagram illustrating a preferred embodiment of the present invention.
Figure 5:
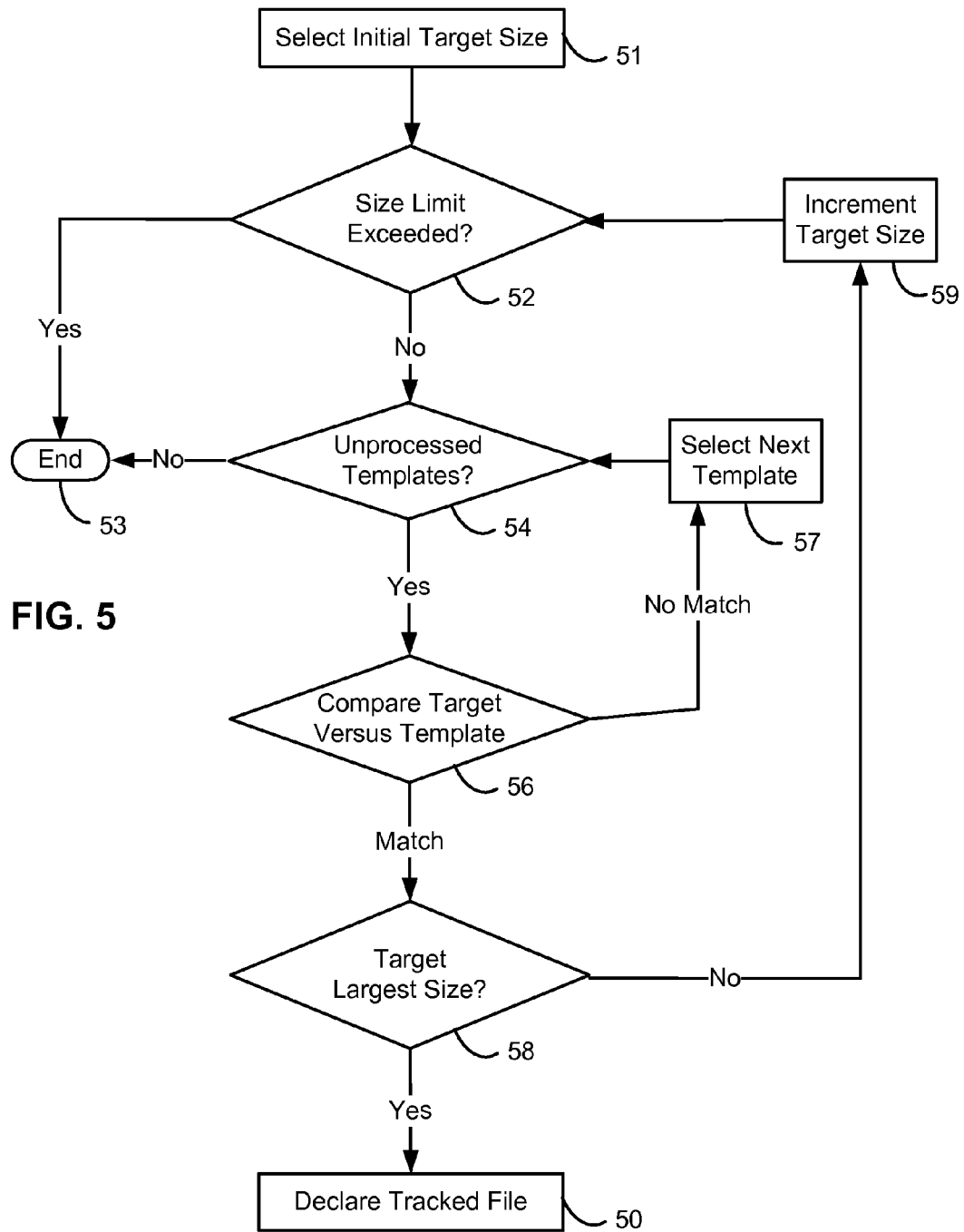
FIG. 5 is a flow diagram of a preferred embodiment of the present invention in which an iterative comparison for the invariant section is used.
Figure 6:
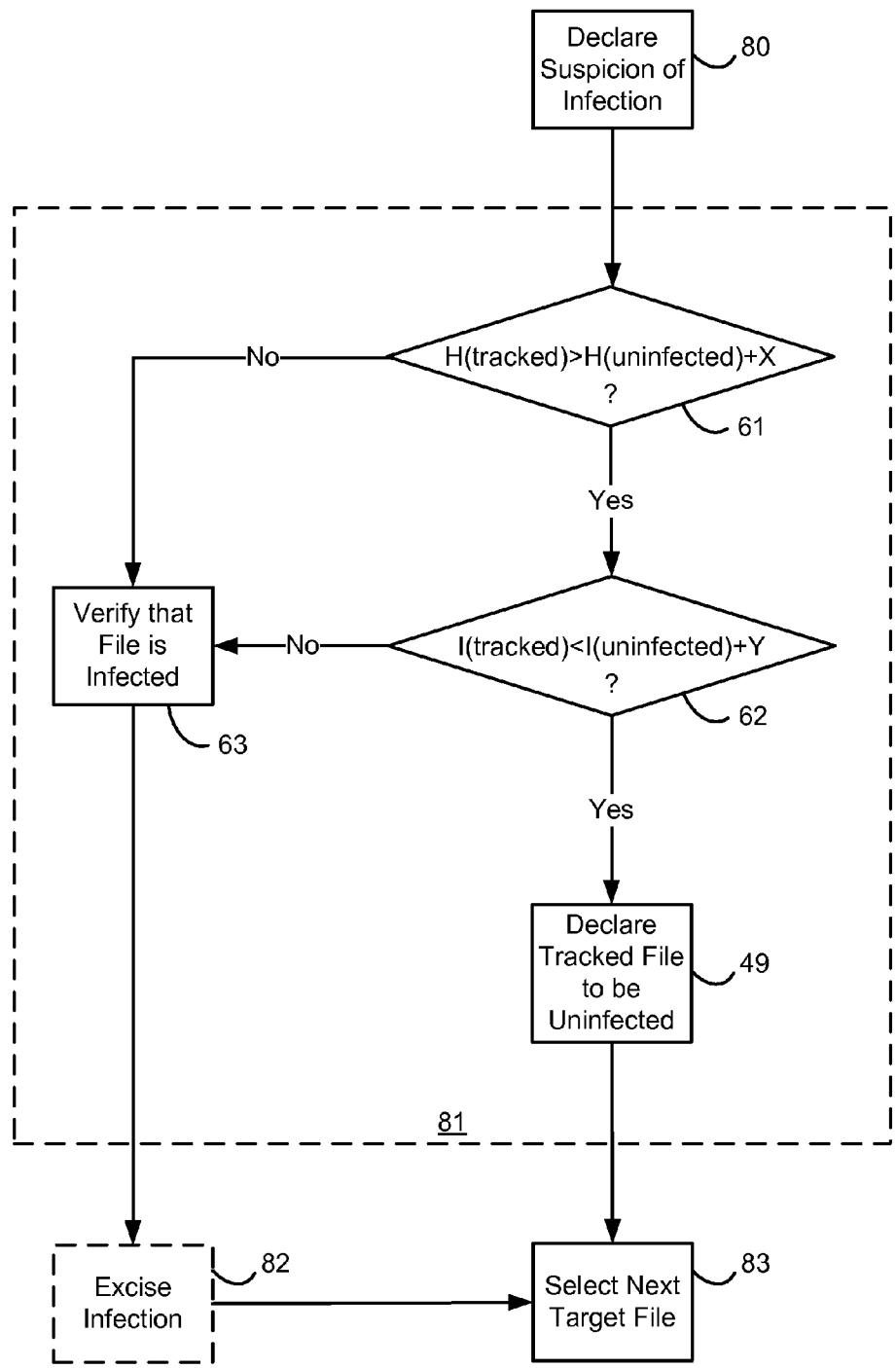
FIG. 6 is a flow diagram of a preferred embodiment of the present invention in which a virus verification technique 81 is employed.

The method steps illustrated in FIGS. 4 through 6 can be implemented by means of the modules 31-37 illustrated in FIG. 3. Modules 31-37 can be implemented in hardware, software, and/or firmware. Modules 31-37 may reside on a computer-readable medium 30 such as memory, a hard disk, floppy disk, CD, DVD, etc. Alternatively, computer readable medium 30 can be broken into two distinct computer readable media 38 and 39. Database-generating computer-readable medium 38 can contain selecting module 31 and generating module 32; while scanning computer-readable medium 39 can contain computing module 33, comparing module 34, declaring module 35, optional verifying module 36, and/or optional excising module 37. Other alternative embodiments exist in which more than two computer readable media are used to house modules 31 through 37. Furthermore, modules 31-37 are exemplary only; other modules can be used to perform the method steps of the present invention, as will be readily apparent to one of ordinary skill in the art.

Selecting module 31 is coupled to generating module 32, which is coupled to computing module 33, which is coupled to comparing module 34, which is coupled to declaring module 35, which is coupled to optional verifying module 36, which is coupled to optional excising module 37.

Turning now to FIG. 4, it is noted that steps 40 and 41 can be performed at the user's computer or at a remote location, e.g., at the site of a company that produces antivirus software.

The method begins at step 40, where selecting module 31 selects a first algorithm that is used in step 41 to generate an infection-variant section, e.g., a hash of a portion (or portions) of a code section 12,13 of each uninfected file 10. Also at step 40, selecting module selects a second algorithm that is used in step 41 to identify a section of each uninfected file 10 that is invariant to a) viral infections of file 10; and b) subsequent repairs to said viral infections. As used throughout this patent application, "section of the file" is to be construed broadly, and encompasses an entire section of file 10 meeting these two criteria, one or more portions of one or more sections of file 10 meeting these two criteria, a hash of a section of file 10 meeting these two criteria, and/or hashes of one or more portions of one or more sections of file 10 meeting these two criteria. Furthermore, "section" can mean a single section, or multiple sections taken together.

The invariant section (also referred to herein as a "template") may be a data section 14,15, a resources section 18, a date and time stamp, a base load address, a version section, a version resource, or any combination thereof. However, this is by no means an exhaustive list, and those skilled in the art will readily appreciate that many other invariant sections could be chosen.

The system designer may define the invariant section based upon the type of file 10. Thus, more than one invariant section-defining algorithm may be selected in step 40. For example, one may wish to target the first data section 14 of a PE file 10, while targeting the resources section 18 plus the date and time stamp for another executable file format. The invariant section should change with legitimate new versions of the file 10.

In a preferred embodiment, the invariant section is a data section 14, 15. This is because a virus rarely infects or modifies a data section 14,15 of an executable file. In addition, antivirus repairs don't modify a data section 14,15 either, since viral infections avoid these areas. Thus, a data section 14,15 is both unique and untouched before and after infection. Virtually every executable file 10 has a data section 14,15 that contains data, e.g., string data, numeric data, etc., that is unique to each program 10 and acts as a unique identifier of the program 10. Therefore, using a data section 14,15 as the invariant section by itself, or coupled with one or more other infection and repair invariant fields elsewhere in the executable file 10, uniquely identifies a program 10 before and after infection, and after repair as well. Furthermore, a data section 14,15 is easily locatable via information in the file header 11. Finally, a data section 14,15 is not dependent on variant sections of the header 11 information, such as entry point code.

In a preferred embodiment, the invariant section is a data section 14, 15 in combination with the version resource. The version resource is a portion of the file 10 that identifies the program's name, its version number, etc. It is usually located in the resources section 18 of the executable file 10. The resources section 18 also contains bitmaps, UI data, etc.

Preferably, a hash is taken of the invariant section, in order to save space and time. As used throughout this patent application, a "hash" or "hash function" is a one-way function, from a variable size input to a fixed size output, that is substantially collision free. Normally, the output is smaller than the input. "One-way" means that it is easy to compute the output from the input, but computationally infeasible to compute the input from the output. "Substantially collision free" means that it is very difficult to find two or more inputs that hash to the same output. Examples of suitable hash functions usable in the present invention are MD5 and a CRC (Cyclic Redundancy Check) function.

At step 40, selecting module 31 also selects an algorithm that is to be used in step 41 to generate an infection-variant section of each uninfected file 10. The infection-variant section comprises a portion of a code section of file 10, the entry point address of file 10, a hash of a portion of a code section of file 10, a hash of the entry point address of file 10, or any combination thereof. As used throughout this specification and claims, "portion of a code section" can mean the entire code section or less than the entire code section. Also as used herein, "hash" can mean one hash or multiple hashes. Also, as defined above in conjunction with the invariant section, "section" can mean a single section or multiple sections taken together.

In a preferred embodiment, the variant section comprises at least one hash of a portion of a code section of file 10. These hashes should be minimal, i.e., represent a hash of only actual program code (executable instructions). All slack space, import tables 16, export tables 17, fix up tables 18, and other zeroed segments of the file 10 that could change because of non-viral reasons are to be ignored in the hash. The section of file 10 to be hashed is selected so that most virally significant modifications to file 10 can be detected. This normally includes viral modifications to executable code segments 12,13 of the file 10, and in particular viral modifications to the entry point. While this information needs to be sufficient to detect viral modifications to file 10, it must not be so sensitive that it detects non-viral modifications to file 10. Thus, the hash or hashes of the code sections 12,13 should be invariant with respect to antivirus repair of a viral infection. If we compute the hash for a clean file 10, and then recompute the hash for the same file 10 once it has been infected and repaired, the hashes should match. While antivirus software often repairs infected files to their original state functionally, such software rarely restores files to 100% of their original state on a bit-by-bit basis. Therefore, while the repaired file 10 usually has a different full file hash than original file 10, a repaired file 10 should have the same minimal hash.

A preferred algorithm for determining the minimal hash of the portion of the code section 12,13 can be visualized by looking at FIG. 2. For purposes of simplicity, it is assumed that there is only one code section 12 and only one hash, keeping in mind that in practice, more than one code section 12, 13 and more than one hash can be used.

The algorithm first locates the first prologue code within code section 12. Prologue code can be identified by such instructions as saving registers, initializing stacks, and push instructions (which store things). The algorithm also identifies the last epilogue code within code section 12. Epilogue code can be identified by a return instruction (returning control from a function call), or a restoration of registers. It is assumed that the executable code between the first prologue code and the last epilogue code, inclusively, contains the critical program code that implements the logic of the program, and therefore should be repair invariant. Slack space in this region is either zeroed out or not included as part of the hash, since the malicious programmer could have inserted viral code within the slack area. The algorithm can take a hash of just a portion of the critical program code. When this is done, the region being hashed should at least straddle the entry point, because when a virus infects file 10, it typically infects the entry point.

In step 41, generating module 32 preferably stores, for each uninfected file 10, the invariant section as defined in step 40, the variant section 12,13 as defined in step 40, the starting point of the hash section (which may be a relative offset (relative to the start of the code section 12, 13) or an absolute offset in the file 10), the length of the hash, the location of slack regions, and the entry point address. The entry point address specifies where the program 10 starts running when launched by the user or when launched automatically by the operating system.

In the embodiment where steps 40 and 41 are generated offsite by an antivirus company, the database of the uninfected files generated in step 41 is sent in optional step 84 by the antivirus company to all users wishing to implement this method for heuristic detection of viruses within target files 10 on their computers.

In a Windows operating system, typical target files 10 are files having extensions .EXE, .DLL, .DRV, .SCR, .OCX, .SYS, or .VXD. It may be desirable to omit database information for certain types of files 10, e.g., files 10 that are susceptible to triggering false positives. One category of such files is files where the author has the habit of cavalierly releasing software updates without updating the file's version information. Other files that tend to trigger false positives are files that have their machine code frequently legitimately modified. In the Windows operating system, such files include KERNEL32.DLL, WINSOCK*.DLL, and other system files.

The remaining steps of FIG. 4 take place within the user's computer, and serve to determine whether target files 10 located thereon are infected with one or more viruses.

At step 42, a module having overall supervisory responsibility (e.g., computing module 33) selects the first target (test) file 10 to be examined for the presence or absence of a virus. If there are no such unprocessed target files 10, as determined by computing module 33 at step 43, the method ends at step 45. If there is such a target file 10 to be processed, the method proceeds to step 44, where computing module 33 uses the same algorithm that was selected in step 40 to compute a target 19 that corresponds to the invariant section for that file 10. This target 19 is used as an index to determine whether the target file 10 is a known (tracked) file 10. An exemplary target 19 is superimposed upon FIG. 1 using dashed lines, and consists, solely for purposes of illustration, of the date and time stamp plus the first data section 14 of file 10.

At step 46, comparing module 34 determines whether the target 19 on the target file 10 matches one of the invariant sections (templates) in the database that was generated in step 41. The method for searching through the templates can be the illustrated linear search or an accelerated search, e.g., one using a binary search tree, a hash table, etc., as is well known to one of ordinary skill in the art. If there is no match, target file 10 is an unidentified file, which means it will not be checked further, and the method proceeds to step 83, where the next target file 10 is selected. If there is a match, target file 10 is deemed to be a "tracked file" 10, and the method proceeds to step 47, where computing module 33 computes the variant section, e.g., at least one hash of a code section 12,13 of the tracked file 10, using the same algorithm that was selected in step 40 for computing minimal hashes.

In step 48, comparing module 34 determines whether the variant section computed in step 47 matches the variant section of that tracked file 10, as found in the database that was generated in step 41. If there is a match in step 48, declaring module 35, in step 49, declares that, because of the invariance in the critical sections of code being compared, tracked file 10 has not been infected by a virus. The next target file 10 is then selected at step 83, and then the method reverts to step 43. On the other hand, if there is no match in step 48, declaring module 35 declares at step 80 that, due to changes to a critical section of code, it is suspected that a virus is present in tracked file 10.

At optional step 81 (illustrated in FIG. 6), optional verifying module 36 verifies the presence of a virus in tracked file 10.

At optional step 82, optional excising module 37 excises the infected code from tracked file 10. This may entail the complete deletion of tracked file 10 from the computer, or the repair of tracked file 10. Control then passes to step 83, where computing module 33 selects the next target file 10 to be processed, then back to step 43.

Step 81 can be present and step 82 absent; step 81 can be absent and step 82 present; steps 81 and 82 can both be present; or steps 81 and 82 can both be absent.

In order to speed processing, the invariant section can be defined in step 40 to be relatively small. This runs the risk, however, of false positive declarations of tracked files 10, because many short file 10 sections can compare to the same value or hash to the same value, whether or not they are sections from known files 10. In order to speed processing without running the risk of increasing the number of false positives, the method of FIG. 5 can be employed, in which comparing step 46 is expanded into a sequence of iterative comparisons.

The method of FIG. 5 works on the basis of an initial relatively small portion of the target 19 being selected in step 51, with the size of the target 19 being incremented in an outer loop 52, 58, 59 surrounding an inner template (invariant section) comparison loop 54, 56, 57. If there are no matches made with a less than maximum target 19 size, there is no need to increment the target 19 size, because it is known there will never be a match, regardless of how large the target 19 becomes. Thus, processing time is saved.

At step 52, computing module 33 asks whether the pre-selected upper bound (uniqueness level) placed on the target 19 size has been exceeded. If so, the method ends at step 53. This uniqueness level can correspond to the size of the target 19 that was established in step 40 of FIG. 4. If this size limit has not been exceeded, the method proceeds to step 54.

At step 54, comparing module 34 asks whether there are any templates at that size yet to be processed. If the answer is no, the method ends at step 53. If the answer is yes, the method proceeds to step 56.

At step 56, comparing module 34 compares the target 19 against the template currently being processed. If the two do not match exactly, the method goes to step 57, where the next template is selected for processing, and then back to step 54. If the target 19 and the template match exactly, the method proceeds to step 58. Again, as before, the method for searching through the templates illustrated in FIG. 5 is a linear search. However, as is well known in the art, many other techniques may be employed to speed the searching, e.g., a binary search tree, a hash table, etc., as is well known to one of ordinary skill in the art.

At step 58, comparing module 34 asks whether the target 19 is the largest size, i.e., whether the size has been incremented up to the pre-selected uniqueness level. If the answer is yes, declaring module 35 declares the target file 10 to be a tracked file 10 at step 50. This is appropriate, because matching at every iteration has occurred. If, on the other hand, the target 19 has not been incremented to its largest size, a match at step 56 does not result in the declaration of a tracked file 10, but rather results in control being passed to step 59, where computing module 33 increments the size of the target 19 upwards to the next pre-selected size. The increments can be uniform or non-uniform, e.g., logarithmic. Control then passes back to step 52.

The reason for not declaring the presence of a tracked file 10 when the match is performed at a template 19 size less than the maximum is that such a match may be a false positive. This is because, for a less than maximum target 19 size, many things can map or hash to the same value. Therefore, we need to do another iteration on a larger portion of the target 19.

Note that the way this iterative sizing process works is that if there is no match at a given target 19 size, the method is aborted, indicating that target file 10 has not been previously made the subject of a database entry in step 41. This saves processing time. A target file 10 is declared (at step 50) to be a tracked (known) file 10 only when there is a match at every target 19 size, including the largest.

The operation of optional verifying module 36 is illustrated in FIG. 6, which shows that step 81 of FIG. 4 has been expanded into three steps, 61, 62, and 63 (plus step 49 from FIG. 4). When optional step 81 is used, it is assumed that when the database was generated in step 41, generating module 32 counted and stored quantities H and I for each uninfected file 10. H is the total number of holes in file 10, and I is the total number of interesting data sequences (IDS's) in file 10. A hole is defined as a string of all ones (or all zeroes, or a repeating string depending upon the operating environment) greater than a preselected threshold value h. An IDS is defined as a string of non-identical bits greater than a preselected threshold value i. FIG. 2 illustrates a case in which h was selected to be five. Thus, the illustrated string of seven consecutive ones is a hole, and the illustrated string of six consecutive zeroes is a hole, but the illustrated strings of four consecutive ones and four consecutive zeroes are not holes. FIG. 2 illustrates the case where i has been selected to be six. Thus, the illustrated sequence of eight non-identical bits is an IDS, whereas the illustrated sequence of three non-identical bits is not an IDS.

Turning to FIG. 6, in step 61, comparing module 34 inquires as to whether H of the tracked file 10 exceeds H of the corresponding uninfected file 10 by a preselected constant, X. If not, the method proceeds to step 63, where declaring module 35 verifies that the tracked file 10 has been infected by a virus. The method then proceeds to optional step 82 as in FIG. 4.

If, on the other hand, the result of the comparison performed in step 61 is answered in the affirmative, the method proceeds to step 62, where comparing module 34 inquires as to whether I of the tracked file 10 is less than the sum of I of the corresponding uninfected file 10 plus another preselected constant Y. In the preferred embodiment, X=Y. If the result of the comparison in step 62 is negative, the method proceeds to step 63. If the result is positive, the method proceeds to step 49, where, as in FIG. 4, declaring module 35 declares that the tracked file 10 was uninfected by a virus. The method then reverts to step 83 as before.

The reasoning behind the algorithm illustrated in FIG. 6 is that if the criteria set forth in steps 61 and 62 are satisfied, it is likely that the difference in hashes was caused by a repair and not by an infection. This is because a repair typically introduces additional holes and removes IDS's.

X is taken in a preferred embodiment to be just less than the size of a typical virus. It is good to avoid very small X's, because just a small increase in holes could be attributable to holes added by the virus itself. On the other hand, it is necessary to avoid really large X's, because otherwise virtually nothing would pass through steps 61 and 62 to step 49.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A computer-implemented method for detecting the presence of viral infections in target files located within a computer, said method comprising the steps of:
    computing a target section corresponding to an invariant section of a target file of the target files, wherein the invariant section comprises a section of the target file that has been identified as unchanged by viral infections of the target file and to repairs thereof;
    scanning the target file with an antivirus scanner;
    declaring the target file to be a tracked file when the target section matches an invariant section in a database generated from uninfected versions of the target files;
    for each tracked file, identifying a variant section that is likely to be varied by a viral infection;
    comparing the variant section in the tracked file with the same variant section in the uninfected version of the tracked file in the database; and
    declaring a suspicion that a virus is present in the tracked file when the two variant sections do not match.

2. The method of claim 1 wherein the variant section comprises a portion of a code section.

3. The method of claim 1 wherein the variant section comprises a hash of a portion of a code section.

4. The method of claim 3 wherein the hash of a portion of a code section of the file in the database is computed using an algorithm, and the same algorithm is used in computing the hash of the portion of the code section in the tracked file.

5. The method of claim 3 wherein the hashes ignore slack regions of code sections.

6. The method of claim 3 wherein the hashes are invariant with respect to antivirus repair of a viral infection.

7. The method of claim 1 wherein the variant section comprises an entry point address.

8. The method of claim 1 wherein the variant section comprises a hash of an entry point address.

9. The method of claim 1 wherein the invariant section is computed using an algorithm, and the scanning step computes the target section using the same algorithm.

10. The method of claim 1 wherein the target files:
    run under a Windows operating system; and
    have extensions from the group of extensions consisting of: .EXE, .DLL, .DRV, .SCR, .OCX, .SYS, and .VXD.

11. The method of claim 1 wherein the first declaring step comprises comparing a subset of the target section with a corresponding subset of invariant sections in the database.

12. The method of claim 1 wherein the first declaring step comprises comparing a hash of the target section with a corresponding hash of invariant sections in the database.

13. The method of claim 1 wherein the first declaring step comprises comparing a hash of a subset of the target section with a corresponding hash of a corresponding subset of invariant sections in the database.

14. The method of claim 1 wherein the invariant section comprises a data section of the file.

15. The method of claim 1 wherein the invariant section comprises a date and time stamp located within the file.

16. The method of claim 1 wherein the invariant section comprises a base load address for the file.

17. The method of claim 1 wherein the invariant section comprises a version resource of the file.

18. The method of claim 1 wherein the first declaring step comprises an iterative sequence of compares, beginning with the comparison of a first portion of the target section with a corresponding portion of invariant sections in the database, and ending with the comparison of a second portion of the target section with a corresponding portion of invariant sections in the database, wherein the first portion is smaller than the second portion.

19. The method of claim 18 wherein, for any iteration, the target file is declared to be not a tracked file when there is no match between the portion of the target section being processed for that iteration and the corresponding portion of any invariant section in the database.

20. The method of claim 18 wherein the target file is declared to be a tracked file only when the last iteration produces a match between the portion of the target section being processed for that iteration and the corresponding portion of an invariant section in the database.

21. The method of claim 1 further comprising the step of excising the virus from the tracked file.

22. The method of claim 1 wherein the invariant section is selected based upon the type of the file.

23. The method of claim 1 wherein the invariant section changes with new legitimate versions of the file.

24. The method of claim 1 wherein files deemed likely to give rise to false positives are omitted from the set of target files that are tested for the presence of viruses.

25. The method of claim 24 wherein the omitted files comprise files where the author has not provided proper versioning information.

26. The method of claim 24 wherein the omitted files comprise files containing machine code that is likely to be legitimately modified.

27. The method of claim 1 wherein a verification that a virus is present is performed when a suspicion is declared that a virus is present.

28. The method of claim 27 wherein the suspicion that a virus is present is rescinded when:
    the total number of holes in the tracked file exceeds the total number of holes in the uninfected version of the file by a preselected constant; and
    the total number of interesting data sequences in the uninfected version of the tracked file plus a preselected constant is greater than the total number of interesting data sequences in the tracked file.

29. A tangible computer-readable medium containing computer code for detecting the presence of viral infections in target files located within a computer, said computer code comprising computer-readable instructions for performing the steps of:

computing a target section corresponding to an invariant section of a target file of the target files, wherein the invariant section comprises a section of the target file that has been identified as unchanged by viral infections of the target file and to repairs thereof;

scanning the target file with an antivirus scanner;

declaring the target file to be a tracked file when the target section matches an invariant section in a database generated from uninfected versions of the target files;

for each tracked file, identifying a variant section that is likely to be varied by a viral infection;

comparing the variant section in the tracked file with the same variant section in the uninfected version of the tracked file in said database; and declaring a suspicion that a virus is present in the tracked file when the two variant sections do not match.

* * * * *